June 18, 1957 J. S. FOLEY 2,796,539

UNIDIRECTIONAL SIGNAL-CONDUCTING SYSTEM

Filed April 12, 1954

INVENTOR.
JERROLD S. FOLEY
BY
Lockwood, Galt, Woodard, & Smith
ATTORNEYS 2,796,539

UNIDIRECTIONAL SIGNAL-CONDUCTING SYSTEM

Jerrold S. Foley, Akron, Ohio, assignor to International Telephone and Telegraph Corporation Application April 12, 1954, Serial No. 422,423

5 Claims. (Cl. 307—149)

The present invention relates to a unidirectional signal-conducting system, and more particularly to a coupling network which transmits signals in one direction only.

The need for a unidirectional coupling network of the type contemplated by this invention arises in a relatively large number of instances wherein it is desired to prevent a signal from being conducted in a reverse sense which would deleteriously affect the operation of a signal-delivering circuit. Particular applications of this invention include the isolation of a plurality of oscillators which are coupled to a common utilization circuit; the prevention of interference between a plurality of radio receivers connected to a common antenna; decoupling and isolation in equipment such as phonographs, microphones, telemetering equipment, and many other applications as will occur to a person skilled in the art.

It is an object of this invention to provide a unidirectional signal-conducting system which functions to conduct a signal in one direction only.

It is another object of this invention to provide a unidirectional coupling system which will conduct only a unipolar signal of given polarity in only one direction.

It is yet another object of this invention to provide a signal-conducting system which functions to conduct an alternating or bi-polar signal in one direction only.

In accordance with the principles of this invention, a signal-conducting system is provided which comprises first and second conductive means, first unidirectionally conducting means interposed in series with said first means for limiting the conduction by said first conductive means to one direction only, and second unidirectionally conducting means connected between said first and second conductive means for limiting conduction therebetween to one direction only, said first and second unidirectionally conducting means being arranged in the circuit to conduct unidirectionally with respect to the juncture thereof with said first conductive means.

For a better understanding of the invention, together with other and further objects thereof, reference is made to the following description taken in connection with the accompanying drawing, the scope of the invention being defined by the appended claims.

Figure 1:
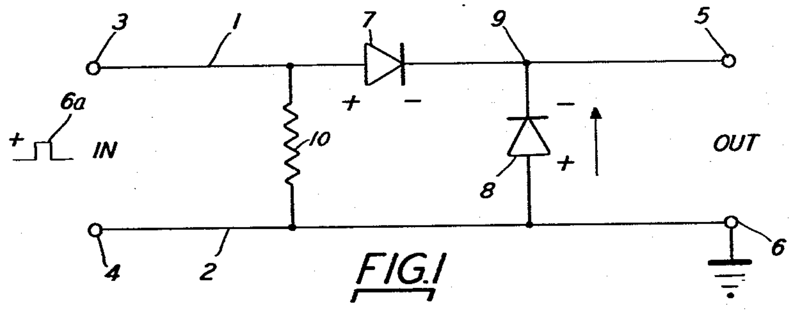
Fig. 1 is a circuit diagram of one embodiment of this invention.

Referring to the drawings, and more particularly to Fig. 1, two ordinary wire conductors or first and second conductive means indicated by the reference numerals 1 and 2, respectively, are arranged in parallel and are terminated at both ends in input and output terminals. The input terminals are indicated by the reference numerals 3 and 4, while the output terminals are designated by the reference numerals 5 and 6. In the circuit illustrated, the line 2 is grounded; however, this is not a requirement for proper operation as will occur to a person skilled in the art.

Connected in series with line 1 is a unidirectionally conductive means or common diode rectifier 7 which is so arranged as to conduct a unipolar or positive-going signal *6a* in a righthand direction only. This rectifier 7 may be of any conventional type or design, such as a vacuum tube diode or a germanium crystal. Other conventional rectifiers will serve just as well so long as the forwardly conducting impedance is low and the back-conducting impedance is high. By this latter statement is meant that the diode conducts preferentially a given unipolar signal in one direction only, and in such direction presents little or no impedance or attenuation.

Connected between the two lines 1 and 2 on the output terminal side of the diode 7 is another diode 8, its negative terminal leading to line 1. Thus in the circuit of Fig. 1, the juncture or common connection 9 between the two diodes 7 and 8 and the line 1 is conductively common with the negative terminals of both diodes.

A resistor 10 of low resistance or impedance as compared to the back-conductive impedance of the diode 7 is connected across the lines 1 and 2 on the input terminal side of the diode 7.

Suitable component parameters for the circuit just described are as follows:

| | |
|---|---|
| Diode 7 | 1N58A. |
| Diode 8 | 1N58A. |
| Resistor 10 | 5,000 ohms. |

By applying a unipolar or positive-going signal across the input terminals 3 and 4, such signal will be conducted freely with negligible loss or attenuation by the diode 7 and will appear at the output terminals 5 and 6 for utilization by any suitable circuit connected thereto. A negative signal applied to the input terminals, however, will not be passed to the output terminals 5 and 6 but will be almost completely attenuated by the diode 7. On the other hand, a positive signal applied across the terminals 5 and 6 will be prevented from appearing across the input terminals 3 and 4 by reason of the substantially infinite impedance presented thereto by the diode 7. However, if a relatively high impedance circuit is connected across the input terminals 3 and 4, the full voltage applied to the terminal 5 will nevertheless appear over the diode 7 which acts, in such instance, as a resistor of extremely high value. Thus the full voltage applied to the terminals 5 and 6 will appear across the terminals 3 and 4 and could affect the operation of the circuit coupled to the latter terminals. The resistor 10 is so selected, however, to have a relatively low impedance as compared with the back-conduction impedance of the diode 7 so that any signal appearing across the diode 7 will be shorted to ground.

A negative-going signal applied to the terminal 5 will simply be shorted to ground via the diode 8, since the latter's polarity is so arranged in the circuit to conduct a negative signal appearing at terminal 5. Thus, neither positive nor negative signals applied to the output terminals can find a path back to the input terminals 3 and 4.

Figure 2:
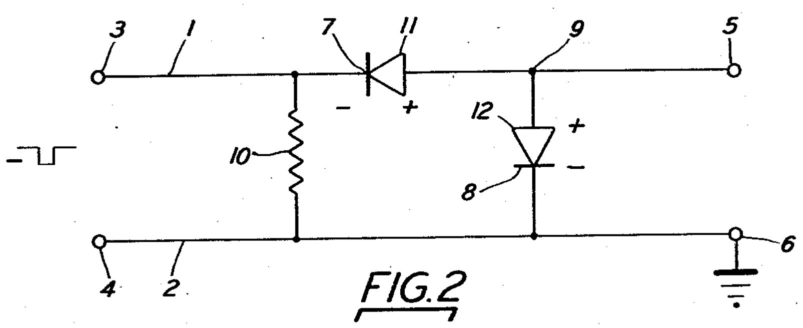
Fig. 2 is a circuit diagram of another embodiment of this invention.

Referring to Fig. 2, like numerals indicate like parts. The only essential difference between the circuit of this figure and the one of Fig. 1 resides in the reversal of the two diodes 7 and 8. As illustrated, the positive terminals 11 and 12 of these two diodes 7 and 8 (Fig. 2 only) connect with line 1 at the juncture 9. This circuit serves to conduct a unipolar signal *6b* from left to right, and as a corollary presents a non-conducting impedance to positive signals. By using the same circuit-operating analysis as was explained in connection with Fig. 1, it will be apparent that neither a positive nor negative signal will be conducted from right to left (backwardly.)

Figure 3:
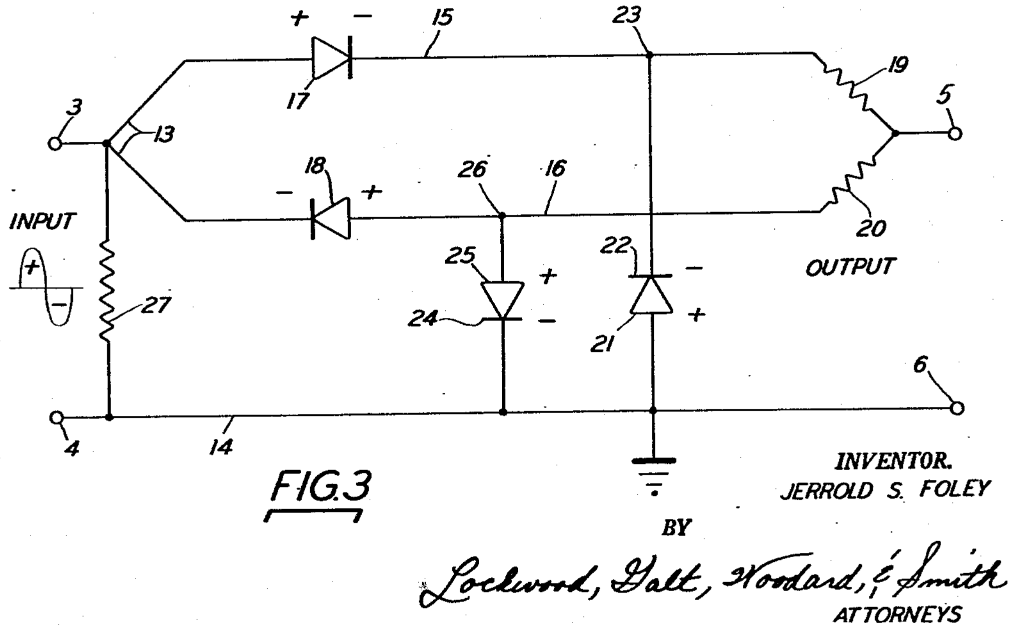
Fig. 3 is a circuit diagram of still another embodiment of this invention, comprised essentially of a combination of the first two embodiments.

In Fig. 3 is illustrated a bi-polar coupling network which essentially comprises the two circuit embodiments of Figs. 1 and 2 in combination. The word "bi-polar" is used to characterize a wave, such as a conventional alternating current voltage wave having positive and negative lobes, which is composed of both positive and negative components. This bi-polar circuit functions to conduct such a bi-polar wave from left to right, and to substantially entirely attenuate any signal applied in the reverse direction.

This circuit is comprised essentially of two parallel-extending conductors 13 and 14, respectively, which extend between the indicated input and output terminals 3, 4 and 5, 6, respectively. The conductor 13 is comprised of two signal arms 15 and 16 which have connected in series therewith two diodes 17 and 18, respectively. The diode 17 in line 15 has its positive terminal on the left and the negative terminal on the right, whereas the diode 18 is connected in its arm in reverse polarity. Also connected in series with the two arms 15 and 16 are two preferably equal value resistors 19 and 20.

A diode 21 has its negative terminal 22 connected to the arm 15 at a point in between the diode 17 and resistor 19, this point of connection or juncture being indicated by the reference numeral 23. Similarly, the diode 24 has its positive terminal 25 connected to the arm 16 at a juncture 26 between the diode 18 and the resistor 20. A suitable resistor 27 is conductively connected between the input terminals 3 and 4.

In operation, this bi-polar system serves to conduct the positive lobe of a wave applied to terminals 3 and 4 via the diode 17 and arm 15. This positive wave is presented with high impedance by the diode 18 of arm 16. Similarly, the negative lobe of the same wave is conducted by the arm 16 but is presented with a non-conducting impedance by the arm 15.

Considering back-conduction by this system, wherein a signal is applied to output terminals 5 and 6, the positive lobe of such a signal will take the path of least resistance through the arm 16 and will be conducted to ground by the diode 24. The resistor 20 is so selected that it will present an impedance substantially greater than the forwardly conducting impedance of the diode 24, whereupon suitable voltage division is obtained for preventing the signal from appearing across terminals 3 and 4. Another function of the resistor 20 as well as the resistor 19 is to isolate the two diodes 17 and 18 to prevent shorting of the latter.

A negative signal applied to the terminal 5 will take the arm 15 as the path of least resistance and will be conducted to ground by means of the diode 21. Any portion of such negative signal which may enter branch 16 will be blocked by the diode 18 which appears as an extremely high resistance. Thus it is seen that the circuit conducts a bi-polar signal in one direction only and will serve to isolate, almost completely, any signal applied to the output terminals 5 and 6 from the input terminals 3 and 4.

While it will be understood that the circuit specifications of this system may vary according to the design for any particular application, the following circuit specifications for a bi-polar system are included, by way of example only, as suitable for an input frequency of approximately 2,200 cycles per second. These specifications were found to provide an attenuation ratio of forward to reverse signal amplitude transmission of 150.

| | |
|---|---|
| Diode **17** | 1NS8A. |
| Diode **18** | 1NS8A. |
| Diode **21** | 1NS8A. |
| Diode **24** | 1NS8A. |
| Resistors **19** and **20** | 500,000 ohms each. |
| Resistor **27** | 5,000 ohms. |

As explained earlier, this invention has particular application in isolating a plurality of relatively sensitive signal generators or oscillators from each other in coupling them to a common utilization circuit. Also, in a system wherein it is desired to operate a multiplicity of radio receivers from a common antenna, it is especially desirable to prevent interaction between such receivers. Such interaction may be materially reduced with negligible attenuation of the usable signal by utilization of this invention. Essentially, one such circuit as illustrated in Fig. 3 could be used with each television receiver with the directional characteristic of such circuit admitting the signal from the antenna to the receiver and preventing any signal generated by the receiver from being conducted back to the antenna.

Other possible uses, which are manifold, will occur to a person skilled in the art.

The terms "negative" and "positive" used in connection with distinguishing polarity or terminal connections of the various diodes mean that the respective diodes will conduct more readily with a D. C. potential connected thereto according to a predetermined polarity. The terminal on the diode which is connected to the postive pole of the D. C. potential for obtaining the heavier conducting condition is, therefore, termed the "positive terminal."

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A signal-conducting system comprising two conductors, one of said conductors being composed of first and second conductive arms which are connected together at the opposite ends, first and second diodes connected in series with said first and second arms, respectively, the polarity connections of said diodes being oppositely arranged in said arms whereby said arms conduct unidirectionally oppositely, two resistors connected in series with said arms, respectively, third and fourth diodes connected between respective arms of said first conductor and said second conductor, all of said diodes being arranged in the circuit to provide unidirectional conduction only with respect to the junctures thereof, respectively, with said arms, said junctures being disposed between the respective resistor and the respective first and second diode.

2. A signal-conducting system comprising two conductors, one of said conductors being composed of first and second conductive arms which are connected together at the opposite ends, first means interposed in said first arm for limiting conduction to one direction only, second means interposed in said second arm for limiting conduction to the opposite direction only, said arms thereby conducting unidirectionally oppositely, third and fourth unidirectionally conducting means coupled between the respective arms and said second conductor, all of said means being arranged to provide unidirectional conduction only with respect to the junctures thereof, respectively, with said arms.

3. A signal-conducting system comprising two conductors, one of said conductors being composed of first and second conductive arms which are connected together at the opposite ends, first means interposed in said first arm for limiting conduction to one direction only, second means interposed in said second arm for limiting conduction to the opposite direction only, said arms thereby conducting unidirectionally oppositely; two impedances coupled in series with said arms, respectively, third and fourth unidirectionally conducting means coupled between the respective arms and said second conductor, all of said means being arranged to provide unidirectional conduction only with respect to the junctures thereof, respectively, with said arms.

4. A signal-conducting system comprising input and output circuits, two conducting networks between said input and output circuits, one of said networks comprising first and second arms which are coupled together at the opposite ends, first and second unidirectionally conducting means coupled in series with said first and second arms, respectively, the polarity connections of said first and second means being oppositely arranged whereby said arms conduct unidirectionally oppositely, two impedances coupled in series with said arms, respectively, third and fourth unidirectionally conducting means coupled between the respective arms and the second network, all of said means being arranged to provide unidirectional conduction only with respect to the junctures thereof, respectively, with said arms, said junctures being between the output circuit and the respective first and second means.

5. A signal-conducting system comprising input and output circuits, two conducting networks between said input and output circuits, one of said networks comprising first and second arms which are coupled together at the opposite ends, first and second unidirectionally conducting means coupled in series with said first and second arms, respectively, the polarity connections of said first and second means being oppositely arranged whereby said arms conduct unidirectionally oppositely, third and fourth unidirectionally conducting means coupled between the respective arms and the second network, all of said means being arranged to provide unidirectional conduction only with respect to the junctures thereof, respectively, with said arms, said junctures being between the output circuit and the respective first and second means.

References Cited in the file of this patent

UNITED STATES PATENTS

| | | |
|---|---|---|
| 2,657,318 | Rack | Oct. 27, 1953 |
| 2,676,250 | Trousdale | Apr. 20, 1954 |
| 2,677,098 | Pike | Apr. 27, 1954 |